March 10, 1925. 1,528,891
P. W. PETERSEN
APPARATUS FOR REFRIGERATING COMESTIBLES
Filed April 4, 1923 2 Sheets-Sheet 1
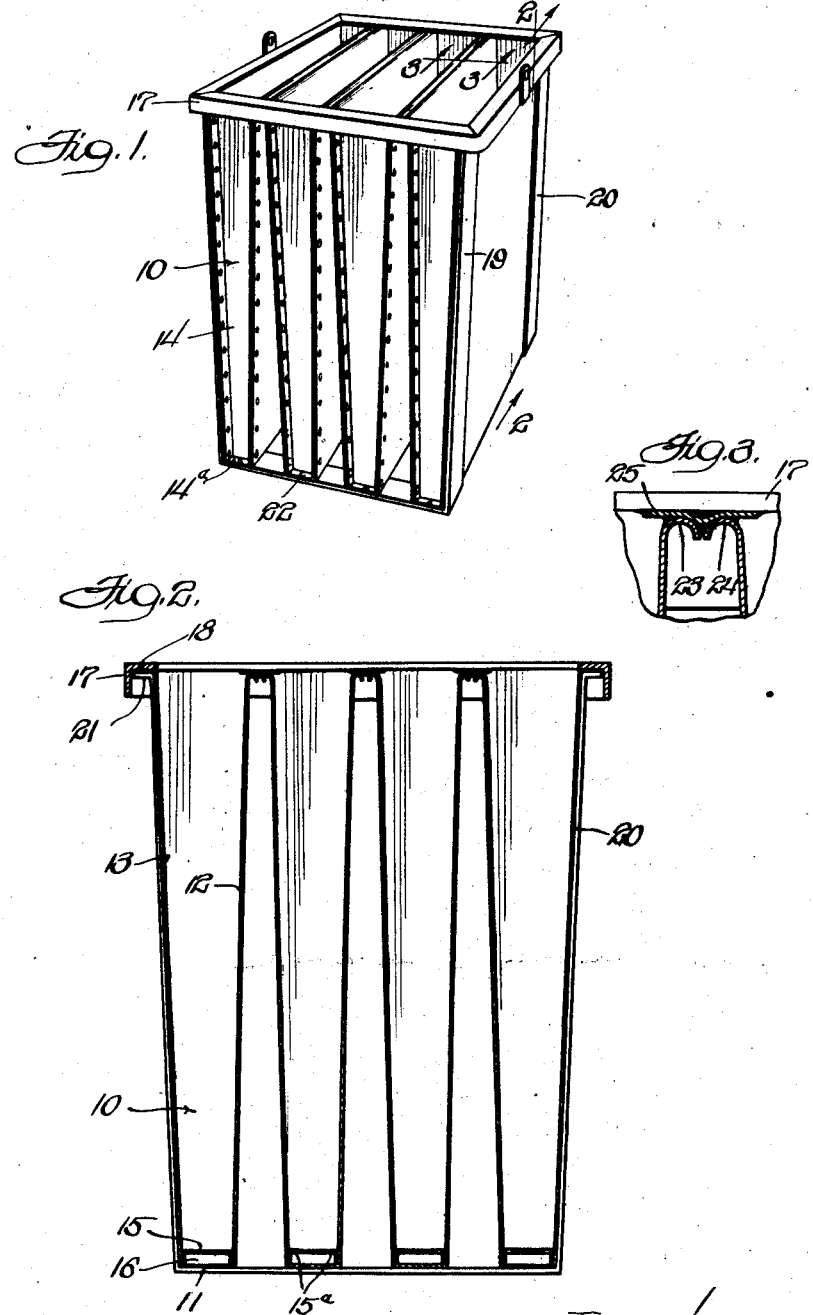

March 10, 1925.  1,528,891
P. W. PETERSEN
APPARATUS FOR REFRIGERATING COMESTIBLES
Filed April 4, 1923  2 Sheets-Sheet 2
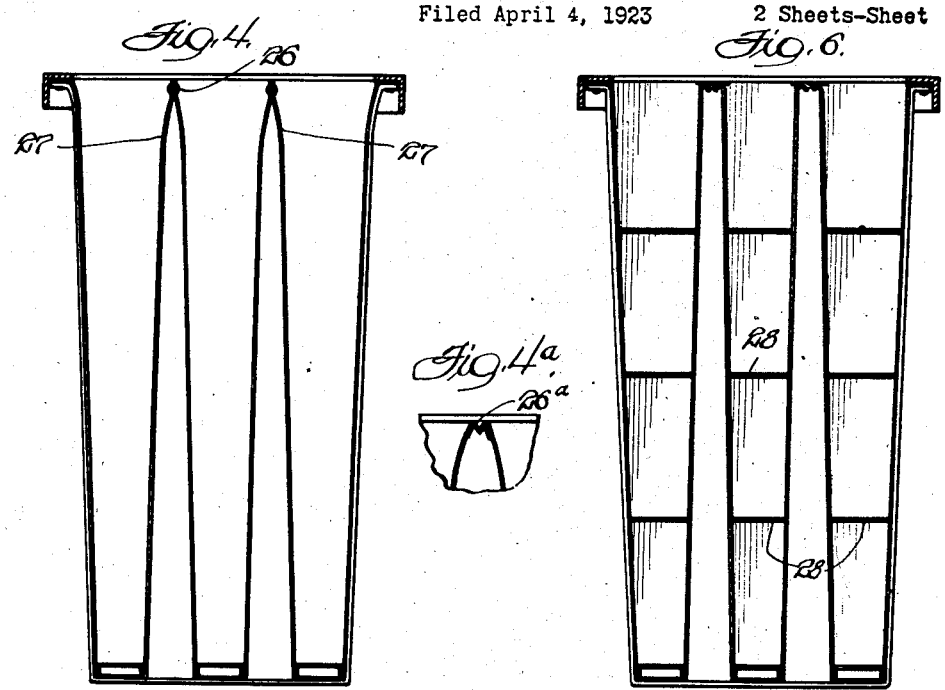
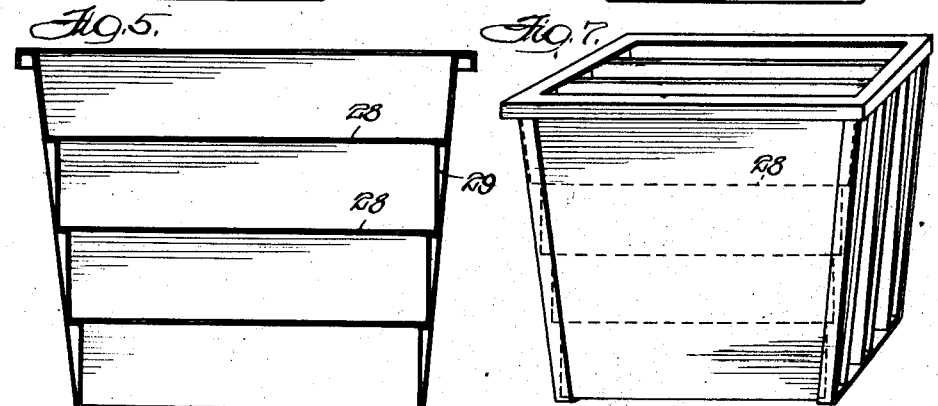
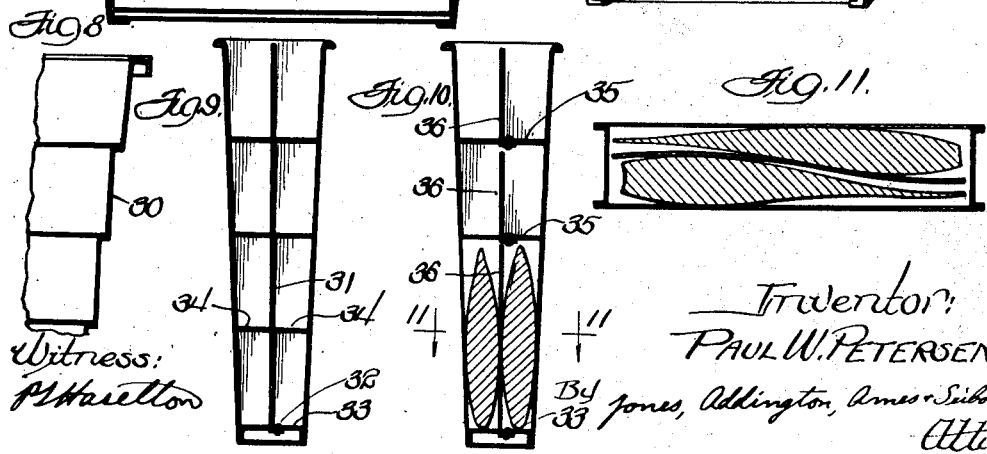
Inventor:
PAUL W. PETERSEN
By Jones, Addington, Ames & Seibold
Attys Patented Mar. 10, 1925.

1,528,891

UNITED STATES PATENT OFFICE.

PAUL W. PETERSEN, OF BAY CITY, MICHIGAN.

APPARATUS FOR REFRIGERATING COMESTIBLES.

Application filed April 4, 1923. Serial No. 629,781.

*To all whom it may concern:*

Be it known that I, PAUL W. PETERSEN, a subject of the Kingdom of Denmark, residing at Bay City, in the county of Bay and State of Michigan, United States of America, have invented new and useful Improvements in Apparatus for Refrigerating Comestibles, of which the following is a full, clear, concise, and exact description, reference being had to the accompanying drawing, forming a part of this specification.

My invention relates to apparatus for preserving comestibles by refrigeration whereby they may be expeditiously and conveniently handled in large quantities and be subjected to the refrigerating action of a liquid refrigerant without having the comestibles suffer any deleterious effects.

More particularly my invention relates to improvements in containers for comestibles which are adapted to facilitate the refrigerating operation, as well as the handling of the comestibles both before and after subjecting them to a refrigerating action.

By means of the apparatus of my present invention, comestibles may be readily handled in large quantities and simultaneously refrigerated to a highly uniform and satisfactory degree by indirect immersion in a refrigerating noncongealing liquid or brine bath. Through the medium of my present apparatus, substantially all of the comestibles may be brought into close proximity with the refrigerant but, however, not in direct contact therewith which might, of course, cause deleterious effects through contamination, change of taste or otherwise.

One object, therefore, of my invention is to provide apparatus for the economical handling and refrigerating of comestibles by immersing them in a refrigerant and, at the same time, having the comestibles inclosed in water-tight containers into which they may be readily placed in regular and neat arrangement and from which they may be conveniently removed after having been refrigerated.

Another object of my invention is to provide an apparatus of the above indicated character which admits of comestibles being simultaneously treated in large quantities while substantially each comestible may be brought into close relation with the action of the refrigerant thereby insuring that the comestibles will be quickly refrigerated.

A further object of my invention is to provide an apparatus to effect the foregoing purposes which is economical to construct and in which the several containers adapted to hold the comestibles are substantially devoid of any rough parts or projections that are likely to bruise or abrade the comestibles thereby impairing their marketability.

A further object of my invention is to provide a container for comestibles which comprises a group of attached compartments having certain of their corresponding edges closely spaced but still constructed in a manner to be flexible to facilitate removal of the comestible after having been frozen therein. Such a container will permit of the comestibles contained therein, when frozen into a solid cake to be removed easily and with less thawing than would otherwise be necessary if the container walls were not flexible.

A still further object of the structure embodying my invention is the provision of a device with the above advantageous characteristics, which at the same time is provided with means for receiving any of the refrigerating liquid that adheres to the exterior of the container and which prevents such liquid from coming into contact with the comestible when the container is tilted or inverted and emptied.

A further aim of my invention resides in the provision of means adapted to be inserted in a container of the character indicated for properly positioning the comestible units therein and for retaining such units in approximately their natural shape during the refrigerating process.

For a better understanding of the nature, scope, characteristic features, and further objects of my present invention, reference may be had to the following description and the accompanying drawing, in which—

Figure 1 is a perspective view of an apparatus for refrigerating comestibles which is constructed in accordance with my invention;

Fig. 2 is a cross-sectional view taken along the line 2—2 of Fig. 1;

Fig. 3 is a detail sectional view taken along the line 3—3 of Fig. 1;

Fig. 4 is a cross-sectional view similar to Fig. 2 but showing a modified form of structure embodying certain features of my invention;

Fig. 4ª is a detail sectional view of a further modification;

Fig. 5 illustrates in vertical longitudinal cross-section a structure embodying my invention and having a plurality of horizontal plates dividing the container into sections;

Fig. 6 shows in vertical transverse cross section a device embodying the features shown in Fig. 5;

Fig. 7 is a perspective view of the device of Fig. 5, the position of the division plates being indicated by dotted lines;

Fig. 8 is a broken sectional view of another modified type of device embodying however several of the essential features of the structure shown in Fig. 5;

Figs. 9 and 10 are transverse sectional views of two further modifications of the container having both horizontal and vertical division plates; and Fig. 11 is a sectional view taken upon the line 11—11 of Fig. 10 showing the approximate position assumed by comestible units when packed in the sections of the container.

The structure as shown in Figs. 1 and 2 constitutes a container composed of a number of spaced compartments as indicated at 10. Each of these compartments may be composed of a flexible metallic sheet bent into an elongated U-shape forming a bottom wall 11 integral with flat and divergent side walls as at 12 and 13. End pieces 14 provided with flanges 14ª, which may be riveted to the U-shaped portion, serve to complete the individual containers.

Within the base of each container 10, a false bottom 15 may be fixed. This false bottom should preferably be provided with perforations 15ª adjacent the side walls as shown, to permit any excess moisture or mucous to drain from the comestible down into a separate space 16. The false bottoms 15 may be fixed in the positions shown or may be removably retained by frictional resistance against the side walls 12 and 13, thereby permitting them to be removed for cleaning when desired.

The entire structure as illustrated, after the compartments have been filled with the comestible, is adapted to be immersed, except for the top portion, in a liquid refrigerant. After the comestible is frozen the container walls may be heated sufficiently in a warming bath to release the comestible therefrom. The false bottoms 15 serve the double purpose of permitting the comestible to be drained free of excess moisture and also of preventing the lower portion of the comestible from coming into contact with three of the compartment surfaces (two sides and bottom), which would result in excessive thawing of this portion when the entire structure is warmed to release the frozen comestible from the side walls.

As illustrated, the individual compartments are formed in a flat shape which readily permits a number of them to be placed side by side in a retaining frame, the character and construction of which will now be described. The top of the container comprising the group of compartments may be surrounded by a peripheral frame composed of angle bars as at 17, which are fixed to flanges as at 18, formed at the top edges of the compartment. A plurality of U-shaped brackets as at 19 and 20 composed of strap iron or the like may extend down around the under side of the compartments and serve to strengthen the compartments, as well as to hold them in their proper spaced relation. The U-shaped brackets may be provided with lugs as at 21 for attachment to the under side of the angle bars 17. The lower ends of the the various compartments may be fixed to the U-shaped brackets by means of rivets as at 22, extending through the flanges 14ª at the edges of the compartments.

It will be noted that as shown, the adjacent top side edges of the various compartments are rolled outwardly and downwardly as at 23 and 24 and are slightly spaced from each other, as best shown in Fig. 3. These rolled edges together with the peripheral frame structure at 17 serve to provide a substantially water-tight and continuous channel around the top edge of each of the compartments. When the container is tilted or inverted in order to empty the comestible therefrom, there may be small quantities of the liquid refrigerant or brine in which the container has been immersed adhering to the exterior compartment walls. As the container is tilted or inverted, if this remaining adhering liquid even though diluted be permitted to flow down around the container openings, the comestible may become contaminated with the brine solution thus rendering the comestible less suitable for use. The channel ways provided as above described serve to prevent such contact of the remaining brine with the comestible and retain or divert such brine until the container is again tilted to its normal upright position.

The substantially abutting rolled portions 23 and 24 while serving the above described purposes are also formed in a manner such that a desirable flexibility of the two side walls of each compartment is still retained. Such flexibility of the compartment walls is very important, since the comestible when in its frozen condition as a solid cake may be removed more easily and with much less thawing than would be necessary if the compartments were not flexible in any manner. The abutting rolled edges 23 and 24 therefore offer a simple and easily constructed means for accomplishing the above indicated advantages.

In order to render the structure rigid without interfering materially with the flexibility of the compartment side walls, small strips 25 bent into a V-shape as shown may be soldered or otherwise fixed beneath the angle bar 17 and to the upper edges of the roller portions, as shown at Fig. 3.

In Fig. 4 a modified type of container embodying the principles of my invention is illustrated. In this structure the top edges of the adjacent container side walls may be firmly fixed to each other in any suitable manner as for instance by riveting at 26. The desired flexibility of the upper portions of the compartments is obtained by the "give" in the adjoining, yielding and diverging side walls as illustrated. The space at 27 between the riveted or otherwise attached side walls provides a channel serving the purpose of the rolled edges in the structure above described.

Fig. 4ª illustrates another method that may be employed in fixing the side walls together in a device of the character shown in Fig. 4 and which also retains the desired flexibility. A flexible separating strip 26ª is shown attached in any suitable manner as by welding to the top edges of each of the adjacent side walls.

In Figs. 5, 6 and 7, the structure is shown provided with a plurality of removable horizontal division plates 28 which serve to divide the compartment into sections. The end walls may be provided with step shaped members as 29 for positioning the plates 27 at predetermined levels in the compartments, or if desired the end walls themselves may be formed in the shape of oppositely directed steps as indicated at 30 in Fig. 8. In order to permit the ready removal of each of the horizontal plates from the various steps the compartments may be considerably longer at the upper edge than at the lower edge as clearly appears in the drawings. With this structure the various sections may be successively packed with the comestibles and with division plates between each section. One or more units of the comestible may be carefully packed in each section in a manner such that as large a surface area as possible is in direct contact with the container walls thus permitting a rapid transfer of heat to the refrigerant. The division plates aid in the proper positioning of the comestible units and serve to retain the units in position and in approximately their natural shape during the freezing process. The plates further tend to prevent distortion and displacement of the comestible units during the handling of the container and also prevent excessive pressure from being exerted by the weight of the comestibles in the upper sections upon the lower sections.

In Figs. 9, 10 and 11 the compartments are shown sub-divided into sub-sections by longitudinal vertical division plates. In Fig. 9, a single vertical division plate 31 is illustrated and is shown riveted at 32 to a double bottom member 33. This plate is accordingly removable with the double bottom and to a certain extent is retained in position thereby. Horizontal division plates, as at 34, may be used and are similar to the plates 28 except that they may be of only one half the width of the compartment. The plates 34 serve to further retain the vertical plate 31 in its proper position substantially at the center line of the container. In Fig. 10 horizontal division plates 35 of full width are shown and each is provided with a vertical plate 36 riveted or otherwise fixed thereto and removable therewith.

As indicated in Fig. 11, these structures are particularly although not exclusively adapted to receive in each sub-section an individual unit of a comestible such as a single fish for example. In the refrigeration of fish or the like, the heads of the fish in adjacent sub-sections may be placed at opposite ends of the sections and the vertical division plates possess sufficient flexibility to permit the two fish to very approximately fill the entire space of a single section in the manner illustrated in Fig. 11. The container space is thus efficiently used; the comestible unit is brought into close contact with large areas of the side walls; and the unit is furthermore in this manner firmly retained in approximately its natural shape during the freezing operation which materially adds to its marketability.

While I have described my invention in detail and illustrated several specific embodiments thereof, it is to be understood that many further modifications may be made thereon without departing from the spirit and scope of the appended claims.

What I claim as new and desire to secure by Letters Patent in the United States, is:

1. An apparatus for refrigerating comestibles in a refrigerating liquid comprising a compartment having an open end, certain of the wall edges at said open end being flexible and provided with channels composed of flexible material for receiving refrigerating liquid adhering to the walls of the container when the container is tilted for emptying, said wall edges together with said channels being of a flexible construction to facilitate removal of the comestible.

2. A compartment for refrigerating comestibles in a refrigerating liquid comprising a sheet metal member bent into an elongated U-shape to form integral side and bottom walls, and end pieces fixed to said member, the upper edges of said U-shape member being bent outwardly and downwardly to form channels to receive refrigerating liquid adhering to the exterior walls of the compartment and to prevent such liquid from coming into contact with the comestibles when the compartment is tilted for emptying.

3. A compartment for refrigerating comestibles in a refrigerating liquid comprising a sheet metal member bent into an elongated U-shape to form integral side and bottom walls, and end pieces fixed to said member, the upper edges of said U-shape member being bent outwardly and downwardly to form channels to receive refrigerating liquid adhering to the exterior walls of the compartment and to prevent such liquid from coming into contact with the comestible when the compartment is tilted for emptying, said upper edges together with the channels formed thereon being flexible to facilitate removal of the comestible from the compartment.

4. An apparatus for refrigerating comestibles in a refrigerating liquid comprising a flat elongated compartment having an open end, the side walls of said compartment being flexible and formed with integral flexible channels along said open end to receive refrigerating liquid adhering to the exterior walls of the compartment and to prevent such liquid from coming into contact with the comestible when the compartment is tilted for emptying.

5. An apparatus for refrigerating comestibles in a refrigerating liquid comprising a frame, a plurality of spaced flat compartments fixed together by said frame and each having an open end and having flexible side walls terminating in integral flexible channels along said open end, the channels of one compartment being spaced from the channels of adjacent compartments, said channels serving to receive refrigerating liquid adhering to the exterior walls of the compartments and to prevent such liquid from coming into contact with the comestible when the compartments are tilted for emptying.

6. An apparatus for refrigerating comestibles in a refrigerating liquid comprising a supporting frame, and a plurality of spaced side by side compartments secured to said frame, said compartments being each provided with an open end, the compartment side walls at said open ends being flexible to facilitate removal of the comestible.

7. An apparatus for refrigerating comestibles in a refrigerating liquid comprising a supporting frame, and a plurality of spaced side by side compartments secured to said frame, said compartments being each provided with an open end, and means at said open ends to receive refrigerating liquid adhering to the exterior walls of the compartments, the compartment side walls at said open ends being flexible to facilitate removal of the comestible.

8. An apparatus for refrigerating comestible units in a refrigerating liquid comprising a narrow elongated compartment having flexible side walls and an open upper end, and a plurality of separately removable and substantially horizontal flexible division plates at predetermined levels in said compartment for positioning the comestible units and for retaining such units in approximately their natural shape during the refrigerating process.

9. An apparatus for refrigerating comestibles comprising a water tight compartment having flexible side walls and being of narrow elongated cross-section and of substantial depth, steps formed at each end of said compartment, and a plurality of plates having their ends resting upon said steps and dividing said compartment into sections for containing the comestible units.

10. An apparatus for refrigerating comestible units in a refrigerating liquid comprising a compartment having flexible side walls and an opening at its upper end, and a plurality of separately removable and substantially horizontal flexible plates at predetermined levels dividing said compartment into sections for containing the comestible units, the end walls of said compartment being formed in the shape of oppositely directed steps for supporting said plates.

11. An apparatus for refrigerating comestible units in a refrigerating liquid comprising a narrow, elongated compartment having flexible side walls and an open, upper end, and a plurality of separately removable substantially horizontal and flexible division plates at predetermined levels forming sections in said compartment, and removable means for vertically and longitudinally subdividing each of the sections, said division plates and said means serving to position the comestible units and to retain such units in approximately their natural shape during the refrigerating process.

12. An apparatus for refrigerating comestible units in a refrigerating liquid comprising a narrow, elongated compartment having flexible side walls and an open, upper end, and a plurality of removable substantially horizontal and flexible division plates at predetermined levels forming sections in said compartment, each of said plates being provided with a vertical flexible barrier extending longitudinally thereof and subdividing each of the sections.

In witness whereof, I have hereunto subscribed my name.

PAUL W. PETERSEN.

Witnesses:
FLORENCE M. BAKER,
MARK A. HORTON.